(12) United States Patent
Huniu

(10) Patent No.: US 6,792,141 B2
(45) Date of Patent: Sep. 14, 2004

(54) INFRARED DETECTION SYSTEM AND METHOD WITH HISTOGRAM BASED MANUAL LEVEL AND GAIN CONTROL WITH LOCAL GAIN CLIPPING

(75) Inventor: Lee J. Huniu, Torrance, CA (US)

(73) Assignee: Raytheon Company, Waltham, MA (US)

( * ) Notice: Subject to any disclaimer, the term of this patent is extended or adjusted under 35 U.S.C. 154(b) by 650 days.

(21) Appl. No.: 09/838,360

(22) Filed: Apr. 19, 2001

(65) Prior Publication Data

US 2003/0007689 A1 Jan. 9, 2003

(51) Int. Cl.[7] .............................. G06K 9/36; H04N 5/33; H04N 5/16; H04N 5/52
(52) U.S. Cl. ...................... 382/169; 382/274; 348/164; 348/255; 348/257; 348/678; 348/686
(58) Field of Search .................................. 382/168, 169, 382/172, 274; 250/332, 339.03, 339.04, 339.09, 352, 370.08, 370.15; 348/678, 686, 255, 257, 672, 229.1, 164

(56) References Cited

U.S. PATENT DOCUMENTS

| | | | | |
|---|---|---|---|---|
| 4,682,229 A | * | 7/1987 | Coates et al. ................ | 348/672 |
| 4,998,209 A | * | 3/1991 | Vuichard et al. ............ | 382/274 |
| 5,081,693 A | * | 1/1992 | Gannon ........................ | 382/312 |
| 5,083,204 A | * | 1/1992 | Heard et al. ................. | 348/164 |
| 5,693,940 A | * | 12/1997 | Botti et al. ................. | 250/252.1 |
| 5,739,531 A | * | 4/1998 | Saylor ......................... | 250/334 |
| 6,130,724 A | * | 10/2000 | Hwang ......................... | 348/678 |
| 6,274,869 B1 | * | 8/2001 | Butler ......................... | 250/338.1 |
| 6,515,285 B1 | * | 2/2003 | Marshall et al. ............. | 250/352 |
| 6,521,892 B2 | * | 2/2003 | Emanuel et al. ............. | 250/332 |
| 6,549,239 B1 | * | 4/2003 | Tao .............................. | 348/371 |
| 6,687,400 B1 | * | 2/2004 | Szeliski ....................... | 382/168 |
| 6,700,628 B1 | * | 3/2004 | Kim ............................. | 348/687 |

FOREIGN PATENT DOCUMENTS

| | | |
|---|---|---|
| WO | WO 97 42756 | 11/1997 |
| WO | WO 99 26410 | 5/1999 |

* cited by examiner

Primary Examiner—Bhavesh M. Mehta
Assistant Examiner—Christopher Sukhaphadhana
(74) Attorney, Agent, or Firm—John E. Gunther; Leonard A. Alkov; William C. Schubert (57) ABSTRACT

A system and method for processing digital video. The invention allows for manual level and gain adjustment of the video similar to that used in a histogram based automatic level and gain control system using a cumulative distribution function. Level changes are made by an offset to the existing automatic level and gain. Level changes are first made by applying an offset L and the midscale gray intensity bin on the histogram is located. Gain changes are made by changing the relative gain multiplier (G) which acts on the automatic level and gain algorithm causing the gain to change equally about midscale gray (i.e., midscale gray is maintained). In accordance with the invention, as part of the histogram based manual level and gain algorithm, the local gain is clipped to a predetermined maximum in order to prevent an overly noisy picture when too much gain is applied. The inventive method determines how to prevent a shift in the level when increasing the gain (i.e., G>1) even when clipping is applied. An anti-saturation algorithm is also applied to prevent saturation from affecting the video too drastically. In order to provide the ability to change the picture from black to white an offset is required under low gain. Lastly, the inventive method allows for fine and coarse adjustments and includes histogram equalization, polarity reversal and gamma correction.

21 Claims, 4 Drawing Sheets

INFRARED DETECTION SYSTEM AND METHOD WITH HISTOGRAM BASED MANUAL LEVEL AND GAIN CONTROL WITH LOCAL GAIN CLIPPING

BACKGROUND OF THE INVENTION

1. Field of the Invention

The present invention relates to infrared detection systems. More specifically, the present invention relates to systems and methods for providing automatic gain and level control in infrared detection systems.

2. Description of the Related Art

Forward looking infrared (FLIR) based imaging systems are widely used to view targets and other objects in darkness and other conditions (smoke, haze, etc.) which might otherwise obscure visible detection. As it is often difficult to discriminate targets from background using an infrared imaging system, systems and methods have been developed for optimizing level and gain adjustments to enhance target detectability of IR imagers.

Many algorithms are known in the art for providing automatic gain and level control for infrared imaging systems. Unfortunately, these systems generally provide no manual adjustment capability. Those that provide manual level and gain control tend to change the picture drastically. This can cause confusion which, in certain (i.e. military) applications, can lead to serious adverse consequences. The dramatic change in the image is due to the fact that in automatic mode, output image intensity is related to detected energy in accordance with a nonlinear relationship using a histogram approach; whereas, in manual mode, output image intensity is related to detected energy in accordance with a linear relationship.

Hence, a need exists in the art for a system or method for improving the performance of infrared imaging displays. More particularly, a need remains in the art for a system or method for providing manual gain and level adjustment of the output of an infrared imager which does not substantially alter the image relative to that seen in an automatic gain and level adjustment mode thereof.

SUMMARY OF THE INVENTION

The need in the art is addressed by the system and method for providing manual level and gain control of an imaging system of the present invention. In accordance with the inventive method a plurality of signals are received from a detector representative of a scene. Next, a histogram of the scene is created. The histogram includes a number of intensity bins and an indication of the number of pixels in each. The histogram is transformed in accordance with a first function which defines how the histogram affects a display of the signals. The method allows for one to set a limit with respect to the first function. The method then determines a normalized cumulative distribution function of the transformed histogram within the limit on localized gain. Finally, the method is adapted to receive gain factor and level input from an operator and define a histogram controlled second function to assign values for each bin in accordance therewith and in accordance with the normalized cumulative distribution function.

In a specific implementation, the method further includes the steps of ascertaining a midscale gray bin for the level shifted transformed histogram and determining a clipped, level shifted normalized cumulative distribution function which maintains midscale gray of the midscale gray bin. In the illustrative embodiment, the step of receiving gain factor and level input further includes the step of determining a normalized cumulative distribution function for each bin. A gray shade is assigned for each bin in accordance with the second function. The inventive method further includes the steps of adjusting the polarity of each bin and effecting a gamma correction on each pixel in each bin.

In an illustrative application, the inventive system and method are used in the processing of digital video. The present invention allows for manual level and gain (MLG) adjustment of the video similar to that used in a histogram based automatic level and gain (ALG) control system using a cumulative distribution function (cdf) which is the area under the histogram. Level changes are made by an offset (L) to the existing ALG level (median) and gain changes are made by changing the relative gain multiplier (G) which acts on the ALG algorithm causing the gain to change equally about the median. ALG is thus a subset of the histogram based MLG in which G=1 and L=0. In accordance with the invention, as part of the histogram based MLG algorithm, the local gain is clipped to a predetermined maximum in order to prevent an overly noisy picture when too much gain is applied. The inventive method determines how to prevent a shift in the level when increasing the gain (i.e., G>1) even when clipping is applied. An anti-saturation algorithm (histogram end bins are clipped) is also applied to prevent saturation from affecting the video too drastically. In order to provide the ability to change the picture from black to white an offset is required under low gain. Lastly, the inventive method allows for fine and coarse adjustments, and also includes histogram equalization (part of the first function), polarity reversal and gamma correction.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
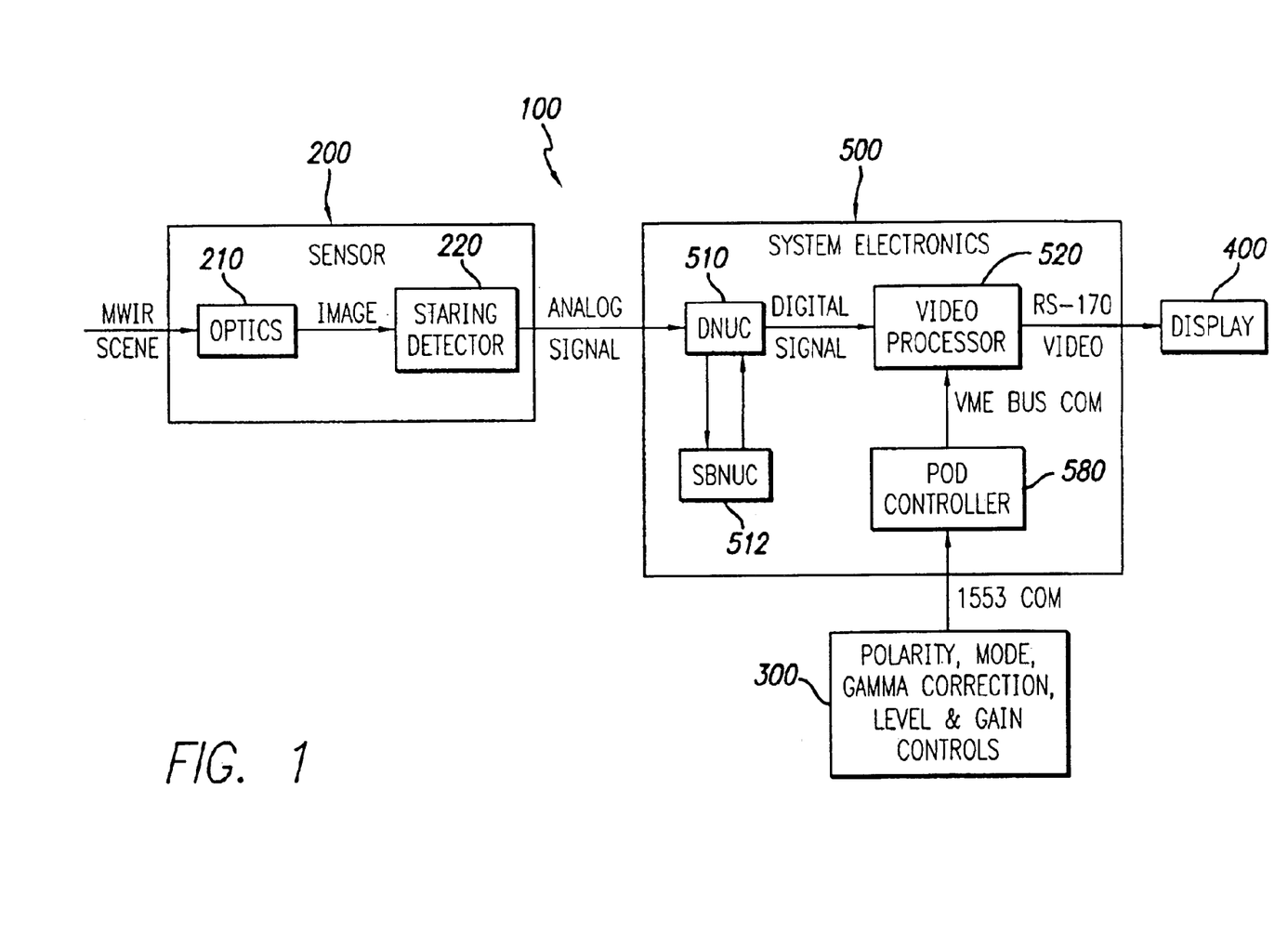
FIG. 1 is a system level block diagram of a gimbaled forward looking infrared imaging system with associated system electronics in accordance with the teachings of the present invention.

FIG. 1 is a system level block diagram of a gimbaled forward looking infrared imaging system with associated electronics in accordance with the teachings of the present invention. The IR imaging subsystem 100 includes a sensor 200, electronics 500, controls 300 and a display 400. The sensor 200 includes optics 210 and, in the illustrative embodiment, an infrared staring detective assembly 220. Input imagery from a scene is received by the optics 210 and provided to the infrared staring detective assembly 220. The image is sampled and output to system electronics 500 as analog FLIR video.

The system electronics unit 500 includes a Video Processor 520 and uniformity correction electronics which includes DNUC (Digital Non-Uniformity Correction) 510 and SBNUC (Scene Based Non-Uniformity Correction) 512. The analog FLIR video is converted to a digital signal in the DNUC 510 and the DNUC 510 and SBNUC 512 apply digital uniformity corrections to each pixel. The resulting digital signal is sent to the Video Processor 520 where the digital video is converted to RS-170 video for the Display 400. Changes to gain and level, polarity, gamma correction and mode (ALG vs. MLG, histogram equalization function) are made using aircraft controls 300 and sent via 1553 communication to the Pod Controller 580. The Pod Controller sends the final gain and level values, polarity (black hot or white hot), gamma correction constants ($\gamma$ and $\lambda$) and mode to the Video Processor 520.

Figure 2:
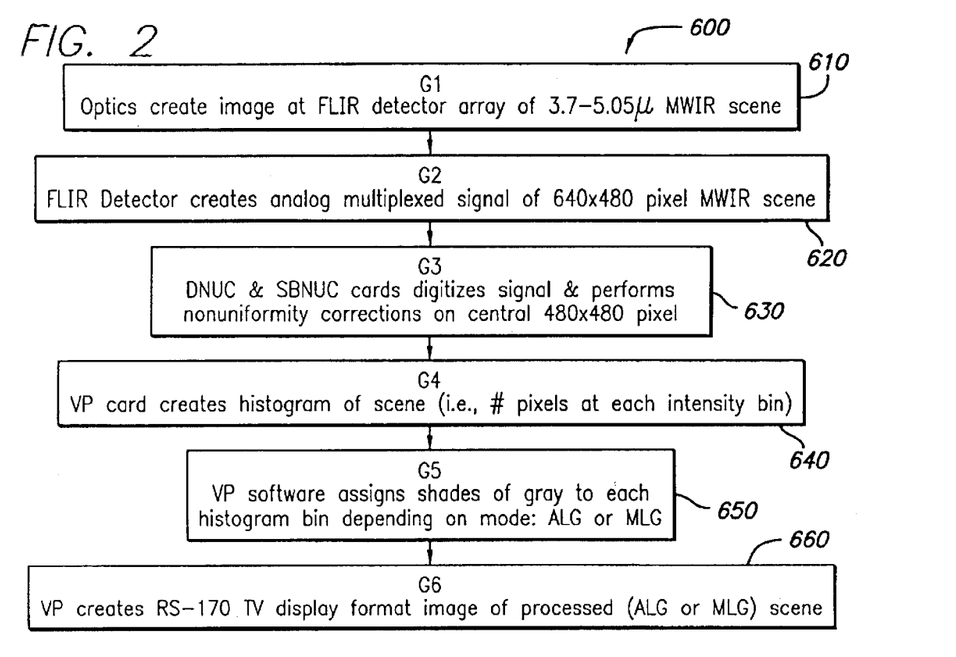
FIG. 2 is a flow diagram illustrating the operation of the system of FIG. 1 in connection with the detection of mid wave infrared images.

FIG. 2 is a flow diagram illustrating the operation of the system of FIG. 1 in connection with the detection of mid wave infrared images. As shown in FIG. 2, the method 600 includes the step 610 of illuminating a detector array with input imagery. At step 620, the detector outputs analog multiplexed signals of the scene. These signals are digitized and corrected for nonuniformities at step 630 by the DNUC 510 and SBNUC 512. At step 640, the video processor 520 creates a histogram of the scene. An example of a histogram is depicted in FIG. 2a.

Figure 2A:
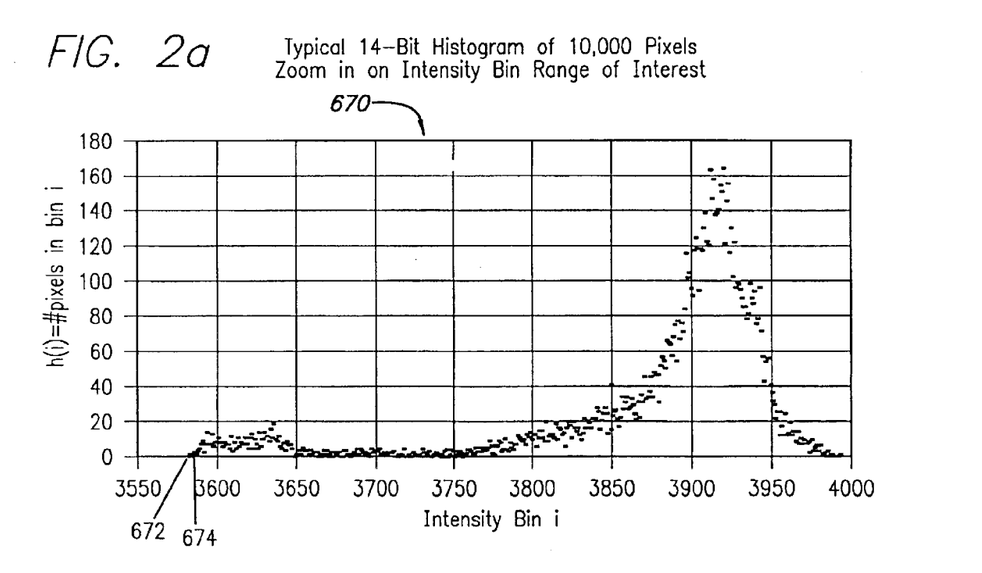
FIG. 2a is a diagram of a typical histogram generated in the detection of infrared imagery.

FIG. 2a is a diagram of a typical histogram generated in the detection of infrared imagery. The histogram 670 provides a number of intensity bins 672 (bin 3582), 674 (bin 3583), etc. (the intensity bins in a 14-bit histogram actually range from 0 to $16383=2^{14}-1$ but the plot 670 zooms in on the range of interest so that individual occupied bins can be made out). The height of each bin is determined by the number of pixels of the detector which output energy at the intensity level associated therewith.

Returning to FIG. 2, at step 650, the video processor 520 assigns shades of gray to each histogram bin depending on the mode of operation. That is, the video processor 520 assigns shades of gray in accordance with an automatic level and gain control algorithm (ALG) or a manual level and gain control mechanism (MLG). As discussed more fully below, in accordance with the present teachings, a manual level and gain control system and method are provided which ensure identical output image between the automatic control mode and manual control mode when there is no shift in gain or level. The teachings of the present invention are best appreciated after a review and consideration of conventional ALG and MLG modes of operation.

Figure 3:
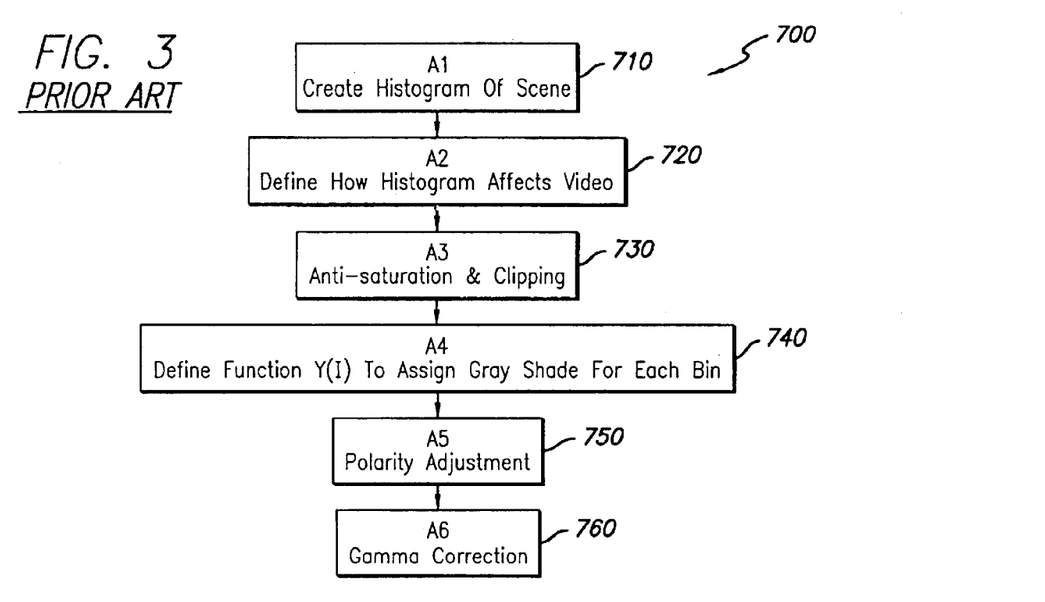
FIG. 3 is a flow diagram of a typical conventional method for providing automatic level and gain control for an infrared imaging system.

FIG. 3 is a flow diagram of a typical conventional method for providing automatic level and gain control for an infrared imaging system. As shown in FIG. 3, the conventional ALG method 700 includes the steps 710 of creating a histogram. Step 710 implements the step 640 of the FIG. 2 where:

$$h(i) = \text{\# pixels at intensity bin "}i\text{"} \quad [1]$$

where $0 \leq i \leq \text{MaxI}$

Next, at step 720, the method 700 defines how the histogram affects video. A transformed histogram is created:

$$\text{trans\_hist}(i) = f(h(i)) \quad [2]$$

where function $f(x)$ is defined for each equalization mode and affects localized gain. In 720, local gain at bin "i" is defined as #gray shades/bin at bin "i" and is proportional to trans\_hist(i). For most cases (for common functions $f(x)$ used in transforming the histogram, like root equalization where $f(x)=x^{0.5}$), increasing the occupancy of the bin will increase the localized gain at that bin.

Next, at step 730, the method 700 optionally optimizes the data with antisaturation and clipping algorithms. When saturation occurs in a large area of the video, the part of the video not saturated would have low contrast and would be too dark if in white hot. Antisaturation reduces these undesirable effects. Antisaturation is effected by recalculating the cumulative distribution function (cdf(MaxI)) when the ends are eliminated as follows:

$$\text{antisaturation-trans\_hist}(i) = 0 \quad [3]$$

at $i=0$, $i=\text{MaxI}$

Clipping prevents the localized gain from being too high. If the localized gain is too high, the video appears too noisy. Hence, in step 730 clipping-trans\_hist(i) is limited to a specified value and the clipped bins are redistributed.

At step 740, the method 700 defines a function Y(i) to assign gray shades for each bin. First, the cumulative distribution function is found as the forward sum of transformed histogram:

$$cdf(i) = \sum_{j=0}^{i} \text{trans\_hist}(j) \quad [4]$$

Next, this function is normalized to create Y(i):

$$Y(i) = \text{norm} * cdf(i) \quad [5]$$

$$\text{norm} = \text{Max}Y/cdf(\text{Max}I) \quad [6]$$

where: $0 \leq Y(i) \leq \text{MaxY}$ and 'MaxY' is maximum value in the gamma\_lut (gamma look up table) domain (on typical systems MaxY has been $4095=2^{12}-1$ for 12-bit or $16383=2^{14}-1$ for 14-bit).

Next, at step 750, the polarity of the function is adjusted:

If white hot: then $Y(i)$ is unchanged $\quad [7]$

If black Hot: then $Y(i) = \text{Max}Y - Y(i)$ $\quad [8]$

Finally, at step 760, the final assignment of gray shades for each bin video\_lut(i) is effected via gamma correction:

$$\text{video\_lut}(i) = \text{gamma\_lut}(Y(i)) \quad [9]$$

For 8-bit analog video:

$$\text{gamma\_lut}(i) = 255 * ((\text{lambda}^{(-i/\text{Max}Y)} - 1)/(1/\text{lambda} - 1))^{\text{gamma}} \quad [10]$$

where lambda (0<lambda<1) and gamma (0<gamma<2) are a function of the display. Gamma correction is a well-known technique for making up for the human eye and imperfect displays by producing video which appear to linearly change with Y(i).

Figure 4:
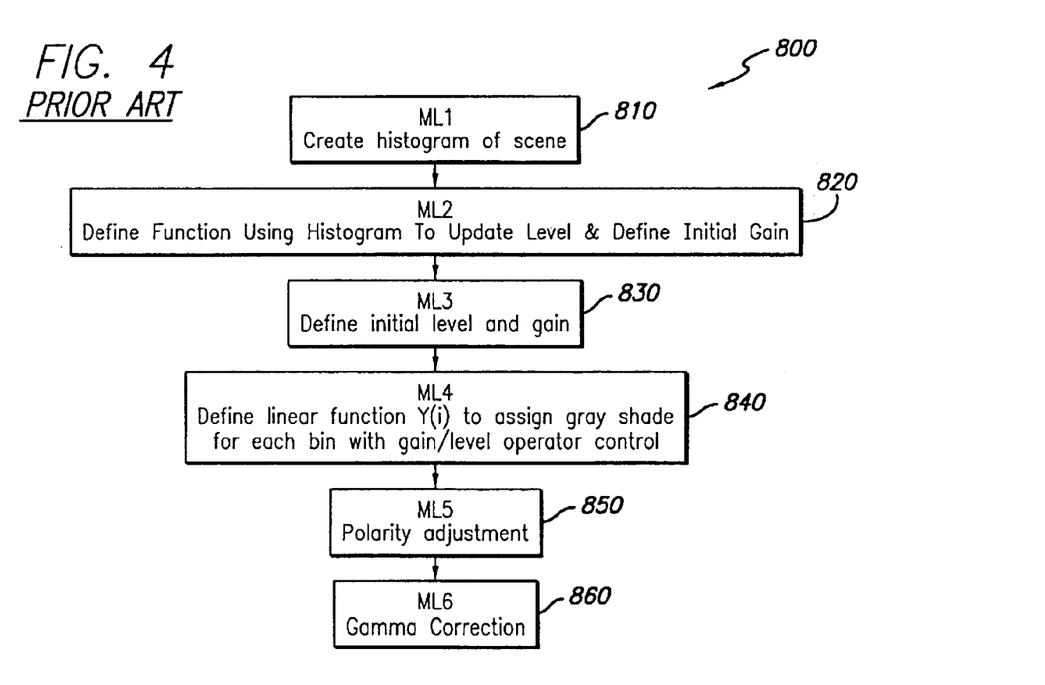
FIG. 4 is a flow diagram of a typical conventional method for providing manual level and gain control for an infrared imaging system.

FIG. 4 is a flow diagram of a typical conventional method for providing manual level and gain control for an infrared imaging system. As shown in FIG. 4, the conventional MLG method 800 includes the steps 810 of creating a histogram. Step 810 implements the step 640 of the FIG. 2.

Next, at step 820, a function is defined using a histogram to update the level of the signals and define an initial gain value by creating a cumulative distribution function equal to the forward sum of the histogram (i.e., the area under the histogram curve):

$$cdf(i) = \sum_{j=0}^{i} h(j) \quad [11]$$

wherein h(j) is the histogram of the scene as a function of intensity bin j.

Initial gain and level must be determined when transitioning from ALG to MLG. At step 830, an initial level is defined and the gain is set based on the cdf endpoints: 1) Initial level L=midI; 2) Initial gain G is based on the cdf endpoints:

$$G=(high\%-low\%)*255/(highI-lowI) \quad [12]$$

where 'midI' is equal to MaxI/2; 'G' is the gain and is the slope of the line established by the 2 endpoints, 'high%' establishes the high endpoint of the cdf and may be chosen by the designer from 60% to 100%; 'low%' establishes the low endpoint of the cdf and is 100%-high%; 'highI' is the bin corresponding to a cdf which is a fraction (fraction=high%/100%) of the maximum cdf value $$\left(i.e., cdf(highI) = \sum_{j=0}^{highI} h(j) = (high\%100\%)*cdf(MaxI)\right);$$

and 'lowI' is the bin corresponding to a cdf which is a fraction (fraction=low%/100%) of the maximum cdf value $$\left(i.e., cdf(lowI) = \sum_{j=0}^{lowI} h(j) = (low\%100\%)*cdf(MaxI)\right).$$

As an example calculation for the method of finding initial gain if endpoints are established based on low%=10% and high%=90%:

$$cum = cdf(MaxI) = \sum_{j=0}^{MaxI} h(j) \quad [13]$$

Since cum should not change over time, the value of cum may be established at power-up initialization.

$$G=(0.9-0.1)*MaxY/(highI-lowI) \quad [14]$$

where $highI = 90\%\ cdf\ point =$ bin such that initial $cdf(highI) = \sum_{j=0}^{highI} h(j) = 0.9*cum$ and $lowI =$ $10\%\ cdf\ point =$ bin such that initial $cdf(lowI) = \sum_{j=0}^{lowI} h(j) = 0.1*cum$.

Next, at step 840, a linear function is defined to assign a gray shade to each bin with a gain and level under operator control. The level is adjusted relative to the median (this auto-level feature is referred to as auto-assist):

$$Y(i)=G*[i-(median+L-midI)]+MaxY/2 \quad [15]$$

where $0 \leq Y(i) \leq MaxY$. The conventional method 800 only updates based on median changes and operator gain/level changes. The level automatically adjusts relative to the median (auto-assist), while gain changes are made relative to the initial gain. The median is 50% cdf point or: median is the bin in which:

$$cdf(\text{median}) = \sum_{j=0}^{median} h(j) = 0.5*cum \quad [16]$$

Finally, at steps 850 and 860, polarity adjustment and gamma correction, respectively, are performed as per the ALG mode depicted in FIG. 3.

Figure 5:
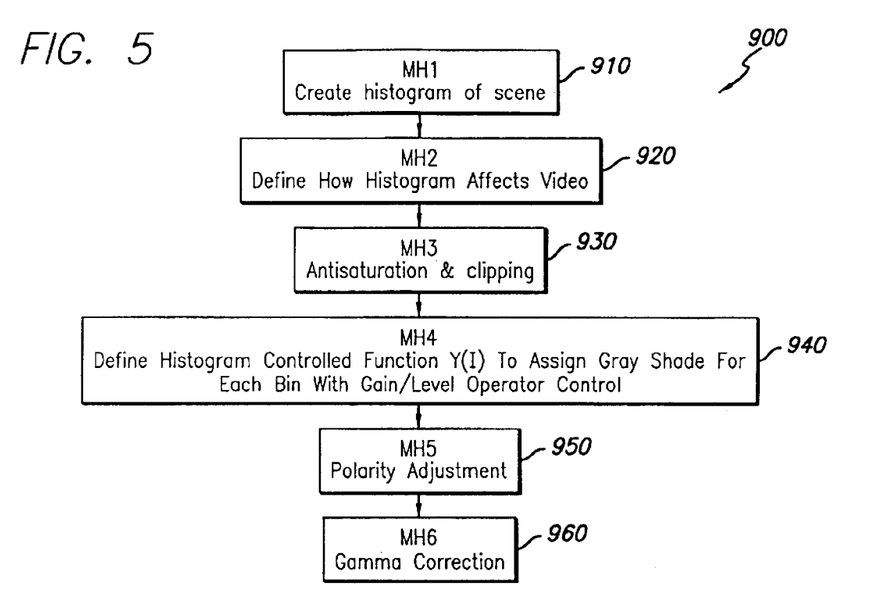
FIG. 5 is a flow diagram of an improved method for providing manual level and gain control in an infrared imaging system in accordance with the teachings of the present invention.

FIG. 5 is a flow diagram of an improved method for providing manual level and gain control in an infrared imaging system in accordance with the teachings of the present invention. The inventive method 900 includes the steps of creating the histogram (910) and defining how the histogram affects video (920) which are implemented in the same manner as steps 710 and 720 of the method 700 of FIG. 3 and steps 810 and 820 of FIG. 4.

At step 930, antisaturation and clipping are performed in a manner similar to that of step 730 of the method 700 of FIG. 3 with the exception that, as discussed more fully below, clipping is applied after the gain change is made thereby preventing the operator from obtaining an excessively noisy and unusable video:

1) antisaturation eliminates the ends as follows:
   recalculate cdf(Max I):

new $cdf(MaxI)$=old $cdf(MaxI)$−trans_hist(0)−trans_hist(MaxI)

eliminate contributions of both ends:

trans_hist(i)=0 at i=0, i=MaxI $\quad$ [17]

2) clipping applied after applying gain as follows:
   Apply Gain and normalize:

hist_clip(i)=G*norm*trans_hist(i) $\quad$ [18]

Clip by not exceeding max_occ:
   If hist_clip(i)>max_occ then hist_clip(i)=max_occ
   cdf_clip(i) & midlevel are then determined (details are provided later).

At step 940, a histogram controlled function (as opposed to the linear controlled function of the method 800 of the prior art) is defined to assign a gray shade to each bin with a gain and level under operator control:

1) determine normalized cdf(i):

$$\text{if clip: } cdf(i) = cdf\_clip(i)/G \qquad [19]$$

where 0<i<MaxI 2) determine Y(i):

$$Y(i) = G*(cdf(i)-\text{midlevel}) + \text{Max}Y/2 + (G<1)*(1-G)*L/2 \qquad [20]$$

where $0 \leq Y(i) \leq \text{MaxY}$.

The inventive method was designed with the assumption that the pilot would adjust the level of the desired target to midscale gray and then boost the gain to increase contrast within the target without changing the average level o the target. The added term $(G<1)*(1-G)*L/2$ is required in order to allow the level to achieve the extremes of black or white video when gain is reduced below 1. The expression (G<1) has a mathematical value of 1 if true and 0 if false.

Gain (G) and level (L) are changed by the operator as follows:

$$G = MLG\_A * MLG\_B^{mlg\_gain} \qquad [21]$$

where MLG_A=minimum gain and MLG_B determines rate of change of G when operator changes mlg_gain (assuming mlg_gain varies from 0 to Max_mlg_gain). In ALG mode, G=1 so initial value of mlg_gain=-Log(MLG_A)/Log(MLG_B).

$$L = (mlg\_\text{level} - \text{Max}\_mlg\_\text{level}/2) * \text{Max}Y/\text{Max}\_mlg\_\text{level} \qquad [22]$$

Assuming mlg_level varies from 0 to Max_mlg_level. The mlg_level is input by the operator and initially equals Max_mlg_level/2 when in ALG (resulting in L=0).

Finally, at steps 950 and 960, polarity adjustment and gamma correction, respectively, are performed as per the ALG mode depicted in FIG. 3.

Figure 6:
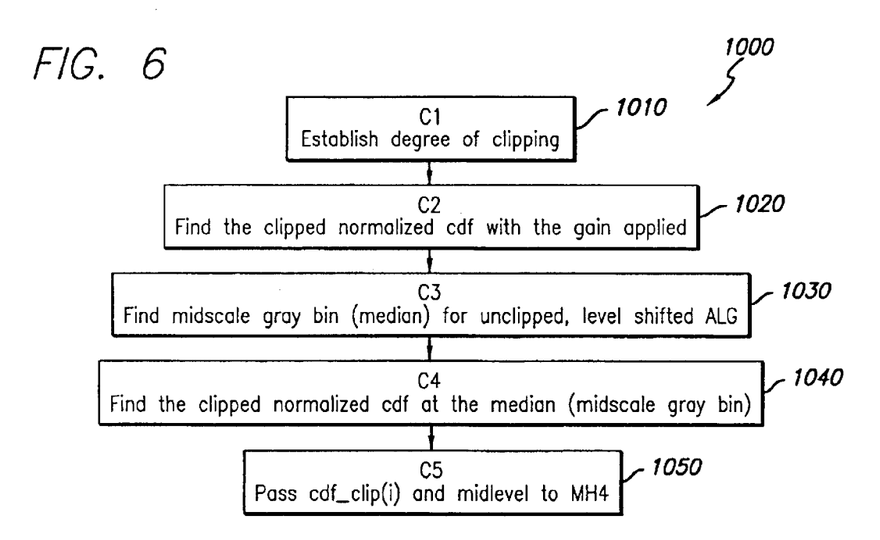
FIG. 6 is a flow diagram of the inventive method for clipping implemented in the method depicted in FIG. 5.

FIG. 6 is a flow diagram of the inventive method for clipping implemented in the step 930 of the method 900 of FIG. 5. The inventive clipping method 1000 includes the step 1010 of establishing the degree of clipping based on establishing the minimum desired dynamic range (minimum dynamic range corresponds to maximum gain). Here, the limit on localized gain is set based on max_occ:

$$\text{max}\_occ = \text{Max}Y/\text{min}\_\text{bins} \qquad [23]$$

where min_bins establishes the minimum number of bins in which the video will spread over the full dynamic range from black to white (or a maximum of 1/min_bins of the dynamic range is spread over 1 bin).

Next, at step 1020, the clipped normalized cumulative distribution function with gain applied is found:

1) Find hist_clip(i) and limit hist_clip(i) to max_occ:
Find hist_clip(i) by normalizing and applying Gain (same as [18]):

$$\text{hist}\_\text{clip}(i) = G * \text{norm} * \text{trans}\_\text{hist}(i) \qquad [24]$$

Clip by not exceeding max_occ:
If hist_clip(i)>max_occ then hist_clip(i)=max_occ 2) Determine cdf_clip(i):

$$cdf\_clip(i) = \sum_{j=0}^{i} \text{hist}\_\text{clip}(j) \qquad [25]$$

Here, clipped cdf is equivalent to clipped Y(i) for ALG except gain is applied. The formula for "norm" is same as in equation [6].

Next, at step 1030, a midscale gray bin for unclipped, level shifted ALG is found:

$$cdf(\text{median}) = \text{Max}Y/2 - L \qquad [26]$$

Here, the cdf is the same as Y(i) for unclipped, level shifted ALG, i.e.:

$$cdf(i) = \text{norm} * \sum_{j=0}^{i} \text{trans}\_\text{hist}(j) + L \qquad [27]$$

The median is calculated as the bin where:

$$cdf(\text{median}) = \text{Max}Y/2 = \text{midscale } Y \text{ value} \qquad [28]$$

Using the cdf just defined and plugging in i=median yields:

$$\text{norm} * \sum_{j=0}^{\text{median}} \text{trans}\_\text{hist}(j) = \text{Max}Y/2 - L \qquad [29]$$

This relationship is used below.

At step 1040, the clipped normalized cdf at the median (midscale gray bin) is found by finding the value of Midlevel:

$$\text{Midlevel} = cdf\_clip(\text{median})/G \qquad [30]$$

unless median doesn't exist.

In step 1040, the "midlevel" is establishing the clipped and normalized cdf value at the same median which was established for G=1 and no clipping (i.e., finding midscale gray for 940 so that gain and clipping do not change the median from the unclipped, ALG median value). In other words, $$\text{midlevel} = cdf\_clip(\text{median})/G \qquad [31]$$

For cases where the median does not exist because of a large level shift, an alternative formulation is required and is derived as follows:

$$\text{midlevel} = cdf\_clip(\text{median})/G \qquad [32]$$

$$\text{midlevel} = \text{norm} * \sum_{j=0}^{\text{median}} \text{trans}\_\text{hist}(j) + \text{clipped}\_\text{bins}\_\text{before}\_\text{median} \qquad [33]$$

Note that equation [33] is based on the definition of clipping.

Plugging in relationship shown in equation [29] yields:

$$\text{midlevel} = \text{Max}Y/2 - L + \text{clipped}\_\text{bins}\_\text{before}\_\text{median} \qquad [34]$$

For L>MaxY/2, by [26] midlevel is negative which means the median (which really can't exist because Y(i) is always greater than 0) in theory occurs before the first bin so clipping has not occurred yet and clipped_bins_before_median is 0; so, midlevel=MaxY/2−L.

For L<-MaxY/2, by [26] midlevel is greater than MaxY which means the median (which really can't exist because Y(i) is always less than MaxY) in theory occurs after the last bin and clipping has been completed with clipped_bins_before_median equal to MaxY-cdf_clip(MaxI)/G; so, midlevel=cdf_clip(MaxI)-MaxY/2-L.

Then, at step 1050, the value of cdf_clip(i) and midlevel are passed to step 940 of FIG. 5.

In short, the novel clipping method differs from the conventional clipping method in that clipping occurs after the gain has been applied and the clipped bins are not redistributed (i.e., instead of redistributing clipped bins, the goal is to maintain midscale gray after increasing gain which is why midlevel is found).

Finally, returning to FIG. 2, at step 660, the video processor 520 of FIG. 1 digitally converts the intensity of each pixel into a shade of gray and outputs the data in an analog television display format (RS-170).

The level and gain adjustments are user friendly in the sense that changing level and gain from the ALG video is immediate and gradual when using fine adjust and fast when using coarse adjust. As required by the pilot, one would first want to make a coarse level change to view the target (which is a subset of the histogram and intensity of the target's pixels are usually near the ends of the histogram where the video is black or white in ALG) at midscale gray and then use a coarse gain increase to provide contrast enhancement of the target. Then a fine level adjust may be necessary before making the last fine gain increase.

The only known histogram based operator controllable algorithm used previously was called ALG2 (ALG2 was implemented on NAVFLIR about 10 years ago). ALG2 did not have local gain clipping or anti-saturation algorithms. In addition, the level and gain adjustments were made in a non-user friendly fashion. Gain was determined by the window size (area of detector's dynamic range chosen) and the level was set as the center of the window. The problem with this algorithm was that the window was initially centered in the center of the detector's dynamic range thereby ignoring where the median (midscale gray bin) was located. One had to increase gain first before one knew how to change the level. Small changes to the gain or level may not change the picture at all if the entire histogram covered only a small portion of the detector's dynamic range and was located near the center of the dynamic range. In short, ALG2 is not user friendly because one does not know which way to adjust level by just looking at the picture, i.e., one has to search for the right level after increasing the gain.

The other prior art described in FIG. 4 is a typical linear MLG algorithm which assumes a linear relationship with the detector output; therefore, the linear MLG algorithm fails to provide higher local gain where the scene dominates thereby providing a washed-up picture unlike the histogram based MLG or ALG algorithms. Switching to a linear based MLG algorithm from a histogram based ALG algorithm results in a major change to the video. With the histogram based MLG algorithm, there is no change to the video when switching from the histogram based ALG video. Because the ATFLIR is DC coupled as most staring FLIRs, the average video level will change dramatically as a function of scene and optics temperature changes. In the linear manual mode without auto-assist it will take significant operator work load to keep up with these changes unlike the histogram based MLG algorithm of the present invention. Even with auto-assist, significant changes in the scene (like transitioning from a ground scene to a combination of sky and ground) would result in the target saturating black or white because the gain is not automatically updating (the auto-assist MLG algorithm fixes the gain on transition from ALG to MLG).

As part of the histogram based MLG algorithm, the local gain is clipped to a predetermined maximum in order to prevent an overly noisy picture when too much gain is applied. In theory, the clipping algorithm can actually improve the MRT performance by reducing the noise of the background.

Lastly, an anti-saturation algorithm (histogram end bins are clipped) is applied to prevent saturation from affecting the video too drastically (large amounts of white saturation will cause the nonsaturated portions of the video to darken excessively). Antisaturation is especially important for MWIR FLIRs where sun glint may be a problem. The local gain-clipping algorithm will also help reduce saturation affects by clipping histogram bins close to the ends.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for providing manual level and gain control of an imaging system comprising:

first means for receiving a plurality of signals from a detector representative of a scene;

second means for creating a histogram of said scene, said histogram including a number of intensity bins and an indication of a number of pixels in said signals from said detector in each of said bins;

third means for transforming said histogram in accordance with a first function which defines how said histogram affects a display of said signals;

fourth means for setting a limit with respect to said function;

fifth means for determining a normalized cumulative distribution function of said transformed histogram within said limit on localized gain; and sixth means for receiving gain factor and level input from an operator and defining a histogram controlled second function to assign values for each bin in accordance therewith and in accordance with the output of said fifth means.

2. The invention of claim 1 wherein said means for setting a limit further includes means for ascertaining a midscale gray bin for transformed histogram.

3. The invention of claim 2 wherein said means for setting a limit further includes means for determining a clipped normalized cumulative distribution function of said midscale gray bin.

4. The invention of claim 3 wherein said sixth means includes means for determining a normalized cumulative distribution function for each bin.

5. The invention of claim 4 further including means for assigning a gray shade for each bin in accordance with said second function.

6. The invention of claim 5 further including means for adjusting a polarity of each bin.

7. The invention of claim 6 further including means for effecting a gamma correction on each pixel in each bin.

8. A program stored on a computer readable medium for providing manual level and gain control of an imaging system comprising:

code for receiving a plurality of signals from a detector representative of a scene;

code for accessing a histogram of said scene, said histogram including a number of intensity bins and an indication of a number of pixels in said signals from said detector in each of said bins;

code for transforming said histogram in accordance with a first function which defines how said histogram affects a display of said signals;

code for setting a limit with respect to said function;

code for determining a normalized cumulative distribution function of said transformed histogram within said limit on localized gain; and code for receiving gain factor and level input from an operator and defining a histogram controlled second function to assign values for each bin in accordance therewith and in accordance with the output of said code for determining.

9. The invention of claim 8 wherein said code for setting a limit further includes code for ascertaining a midscale gray bin for transformed histogram.

10. The invention of claim 9 wherein said code for setting a limit further includes code for determining a clipped normalized cumulative distribution function of said midscale gray bin.

11. The invention of claim 10 wherein said code for receiving gain factor and level input includes code for determining a normalized cumulative distribution function for each bin.

12. The invention of claim 11 further including code for assigning a gray shade for each bin in accordance with said second function.

13. The invention of claim 12 further including code for adjusting a polarity of each bin.

14. The invention of claim 13 further including code for effecting a gamma correction on each pixel in each bin.

15. A method for providing manual level and gain control of an imaging system including the steps of:

receiving a plurality of signals from a detector representative of a scene;

creating a histogram of said scene, said histogram including a number of intensity bins and an indication of a number of pixels in said signals from said detector in each of said bins;

transforming said histogram in accordance with a first function which defines how said histogram affects a display of said signals;

setting a limit with respect to said function;

determining a normalized cumulative distribution function of said transformed histogram within said limit on localized gain; and receiving gain factor and level input from an operator and defining a histogram controlled second function to assign values for each bin in accordance therewith and in accordance with the result of the determining step.

16. The invention of claim 15 wherein the step of setting a limit further includes the step of ascertaining a midscale gray bin for transformed histogram.

17. The invention of claim 16 wherein the step of setting a limit further includes the step of determining a clipped normalized cumulative distribution function of said midscale gray bin.

18. The invention of claim 17 wherein the step of receiving gain factor and level input includes the step of determining a normalized cumulative distribution function for each bin.

19. The invention of claim 18 further including the step of assigning a gray shade for each bin in accordance with said second function.

20. The invention of claim 19 further including the step of adjusting a polarity of each bin.

21. The invention of claim 20 further including the step of effecting a gamma correction on each pixel in each bin.

* * * * *

UNITED STATES PATENT AND TRADEMARK OFFICE
CERTIFICATE OF CORRECTION

PATENT NO.    : 6,792,141 B2
DATED         : September 14, 2004
INVENTOR(S)   : Lee J. Huniu It is certified that error appears in the above-identified patent and that said Letters Patent is hereby corrected as shown below:

<u>Column 1,</u>
Line 5, insert the following paragraph:
-- This invention was made with Government support under contract N00019-97-C-0009 awarded by the Department of the Navy. The government has certain rights in this invention. --

Signed and Sealed this

Second Day of November, 2004

JON W. DUDAS
*Director of the United States Patent and Trademark Office*